United States Patent
Kim et al.

(10) Patent No.: US 11,764,839 B2
(45) Date of Patent: Sep. 19, 2023

(54) CELL-FREE MASSIVE MIMO TRANSMISSION METHOD, AND APPARATUS FOR THE SAME

(71) Applicant: ELECTRONICS AND TELECOMMUNICATIONS RESEARCH INSTITUTE, Daejeon (KR)

(72) Inventors: Min Hyun Kim, Daejeon (KR); Seung Eun Hong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 200 days.

(21) Appl. No.: 17/461,633

(22) Filed: Aug. 30, 2021

(65) Prior Publication Data
US 2022/0123795 A1    Apr. 21, 2022

(30) Foreign Application Priority Data
Oct. 16, 2020  (KR) .......................... 10-2020-0133959

(51) Int. Cl.
*H04B 7/0452*   (2017.01)
*H04L 5/00*   (2006.01)
*H04B 17/318*   (2015.01)
*H04W 72/23*   (2023.01)

(52) U.S. Cl.
CPC ......... *H04B 7/0452* (2013.01); *H04B 17/318* (2015.01); *H04L 5/0048* (2013.01); *H04W 72/23* (2023.01)

(58) Field of Classification Search
None
See application file for complete search history.

(56) References Cited

U.S. PATENT DOCUMENTS

| | | |
|---|---|---|
| 5,781,532 A | 7/1998 | Watt |
| 9,112,758 B2 | 8/2015 | Niu et al. |
| 9,648,539 B1 | 5/2017 | Hou et al. |
| 9,893,773 B2 | 2/2018 | Marzetta et al. |
| 10,555,213 B2 | 2/2020 | Cho et al. |
| 10,567,066 B2 | 2/2020 | Jeon et al. |

(Continued)

FOREIGN PATENT DOCUMENTS

| | | |
|---|---|---|
| WO | 2018/009577 A1 | 1/2018 |
| WO | 2018/119153 A2 | 6/2018 |

*Primary Examiner* — Minh Trang T Nguyen
(74) *Attorney, Agent, or Firm* — Rabin & Berdo, P.C.

(57) ABSTRACT

An operation method of a CP may comprise: requesting a status report from each of terminals and receiving the status report; determining switching from basic transmission mode to cell-free massive MIMO transmission mode for at least part of the terminals based on the status reports; instructing the at least part of the terminals and at least one AN to perform cell-free massive MIMO transmission for the at least part of the terminals to configure cell-free massive MIMO transmission mode; determining analog beam(s) and/or digital precoder(s) to be applied by the at least one AN to the at least part of the terminals based on channel qualities between the at least part of the terminals and the at least one AN; and allowing the at least one AN to perform cell-free massive MIMO transmission to the at least part of the terminals using the analog beam(s) and/or digital precoder(s).

20 Claims, 10 Drawing Sheets

(56) References Cited

U.S. PATENT DOCUMENTS

| | | | |
|---|---|---|---|
| 2016/0134438 A1* | 5/2016 | Marzetta | H04L 25/0228 370/315 |
| 2017/0208613 A1 | 7/2017 | Nam et al. | |
| 2020/0068645 A1 | 2/2020 | Chang et al. | |
| 2021/0143874 A1* | 5/2021 | Park | H04W 72/23 |

* cited by examiner

FIG. 7

| | |
|---|---|
| Algorihm 1 Analog Beam Selection(CP Processing) | |
| Require: $M,B,L,K$,$RSRP_{m,b,k}$ for $m \in \{1,\cdots,M\}, b \in \{1,\cdots,B\}, k \in \{1,\cdots,K\}$ | |
| 1: Initialize: S: empty set, $A$:$\{(m,b) \mid m \in \{1,\cdots,M\}, b \in \{1,\cdots,B\}\}$ | |
| 2: for $i = 1 : M \times L$ do | |
| 3:     $k_{min} = \arg\min_{k'} \sum_{(m,b,k) \in S, k=k'} RSRP_{m,b,k}$ | |
| 4:     $(m',b') = \arg\max_{(m,b) \in A} RSRP_{m,b,k_{min}}$ | |
| 5:     $S = S \cup \{(m',b',k_{min})\}$ | |
| 6:     $A = A - \{(m',b')\}$ | |
| 7:     $A_{m'} = \{(m,b) \mid (m,b) \in A$ and $m = m'\}$ | |
| 8:     if $\mid A_{m'} \mid = B-L$ then | |
| 9:       $A = A - A_{m'}$ | |
| 10:    end if | |
| 11:end for | |
| 12:return $S$ | |

FIG. 8

| Step 1 | Initialize $f^0$ (MRT or ZFBF) |
|---|---|
| Step 2 | In the $m$-th iteration |
| | Compute $[\bar{B}(f^{(m-1)})]^{-1}\bar{A}(f^{(m-1)})$ |
| | $f^{(m)} := [\bar{B}(f^{(m-1)})]^{-1}\bar{A}(f^{(m-1)})f^{(m-1)}$ |
| | $f^{(m)} := \dfrac{f^{(m)}}{\Vert f^{(m)} \Vert_2}$ |
| Step 3 | Iterates until $\Vert f^{(m-1)} - f^{(m)} \Vert_2 \leq \epsilon$ |

CELL-FREE MASSIVE MIMO TRANSMISSION METHOD, AND APPARATUS FOR THE SAME

CROSS-REFERENCE TO RELATED APPLICATIONS

This application claims priority to Korean Patent Application No. 10-2020-0133959, filed on Oct. 16, 2020, with the Korean Intellectual Property Office (KIPO), the entire contents of which are hereby incorporated by reference.

BACKGROUND

1. Technical Field

The present disclosure relates to a mobile communication system using hybrid beamforming, and more particularly, to a transmission method for cell-free massive MIMO (cFmMIMO) and an apparatus therefor.

2. Related Art

The evolved mobile communication network after the long term evolution (LTE) should satisfy technical requirements for supporting more diverse service scenarios as well as a high transmission speed, which has been a major concern in the prior arts. The ITU-R defined key performance indicators (KPIs) and requirements for IMT-2020, the official name of 5G mobile communication, which include a high transmission speed (i.e., enhanced mobile broadBand, eMBB), a short transmission latency (i.e., ultra reliable low latency communication, URLLC), and a massive machine type communication (mMTC). The third generation partnership project (3GPP) is developing 5G standard specifications based on a new radio access technology (RAT) that satisfies the IMT-2020 requirements. According to the definition of the 3GPP, the new radio access technology is a radio access technology that does not have backward compatibility with the existing 3GPP radio access technology. A new radio communication system adopting such the radio access technology after the LTE will be referred to as a new radio (NR) system in the present disclosure.

One of the characteristics of the NR different from those of the WCDMA and the LTE, which are the conventional 3GPP systems, is that it utilizes a wide range of frequency bands to increase transmission capacity. In the 3GPP, bands from 1 GHz to 100 GHz are considered as candidate NR bands. In general, it is known that propagation losses such as a path loss and a reflection loss are relatively large compared to a low frequency band because diffraction and reflection characteristics of radio waves are not good in a high frequency band. Accordingly, when the NR system operates in a high frequency band, a cell coverage may be reduced compared to that of the existing low frequency band. In order to solve this problem, a method of extending a cell coverage through beamforming using a plurality of antennas in a high frequency band may be considered.

In implementing beamforming, analog beamforming may be implemented cost-effectively because it does not require an RF chain for each antenna by steering signals only with phase shifters, which are analog elements, but has a limitation in implementing high resolution. On the other hand, digital beamforming has high accuracy by freely adjusting sizes and phases of signals through digital signal processing to steer the signals, but there are cost and complexity problems because it requires an RF chain for each antenna. Therefore, it can be said that a hybrid beamforming technology that can properly obtain advantages by using the two beamforming schemes together is essential for future mobile communication systems.

Meanwhile, as a large-capacity mobile network structure to accommodate explosive and continuously increasing mobile traffic, an ultra-dense network (UDN) with miniaturized cells having increased density is attracting a lot of attention. Accordingly, the ITU and 3GPP consider a high-density urban environment as a 5G system evaluation scenario, and although not explicitly, there is a movement to reflect technical elements considering the UDN environment to radio access network (RAN) technical specifications. The UDN enables a high transmission rate through link quality improvement by locating transmission nodes such as base stations as close to terminals as possible by miniaturizing cells and increasing a density thereof. However, it is well known that, due to proximity, serious inter-cell interference may occur, which makes it difficult to improve system performance beyond a certain limit even if cell density is increased. Therefore, interference management and cooperative transmission are the most important technical issues in the UDN.

In the UDN environment, since the interference problem cannot be sufficiently solved by simply extending the interference management and cooperative transmission techniques proposed in the existing cellular system, technologies more suitable for the UDN structure are needed. Accordingly, it is required to study application of cell-free massive MIMO (cFmMIMO) transmission technologies, which are attracting attention as new interference management and cooperative transmission technologies in the next-generation communication system, to the UDN environment.

SUMMARY

Accordingly, exemplary embodiments of the present disclosure are directed to providing an operation method of a centralized processor (CP) controlling access nodes (ANs) to operate by switching between a basic transmission mode and a cell-free massive multi-input multi-output (MIMO) transmission mode. Accordingly, exemplary embodiments of the present disclosure are directed to providing a CP to which the above operation method is applied. Accordingly, exemplary embodiments of the present disclosure are directed to providing a system that performs cell-free massive MIMO transmission by using the CP and the ANs.

According to a first exemplary embodiment of the present disclosure, an operation method of a centralized processor (CP), in a system performing cell-free massive MIMO (cFmMIMO) transmission, may comprise: requesting a status report from each of terminals and receiving the status report; determining switching from a basic transmission mode to a cell-free massive MIMO transmission mode for at least part of the terminals based on the status reports; instructing the at least part of the terminals and at least one access node (AN) to perform cell-free massive MIMO transmission for the at least part of the terminals to configure the cell-free massive MIMO transmission mode; determining analog beam(s) and/or digital precoder(s) to be applied by the at least one AN to the at least part of the terminals based on channel qualities between the at least part of the terminals and the at least one AN; and allowing the at least one AN to perform the cell-free massive MIMO transmission to the at least part of the terminals using the analog beam(s) and/or digital precoder(s).

The basic transmission mode may be a cellular transmission mode in which a single AN provides services to a single terminal.

The cell-free massive MIMO transmission mode may be a mode in which hybrid beamforming-based cooperative transmission in which the at least one AN participates is performed for the at least part of the terminals.

The at least part of the terminals may include terminal(s) requesting switching to the cell-free massive MIMO transmission mode to the CP and/or terminal(s) having a bad channel state.

In the instructing to configure the cell-free massive MIMO transmission mode, the CP may configure a virtual cell identifier (ID) to the at least part of the terminals and the at least one AN as a higher layer parameter.

The channel qualities between the at least part of the terminals and the at least one AN may be measured by sounding reference signal(s) (SRS(s)) transmitted by the at least part of the terminals, and sequence(s) of the SRS(s) may be generated by the virtual cell ID.

Each of the channel qualities may be measured as a reference signal received power (RSRP).

The instructing to configure the cell-free massive MIMO transmission mode and scheduling for the cell-free massive MIMO transmission performed by the at least one AN may be performed through two-stage downlink control information (DCI), or performed through one joint DCI.

The system performing the cell-free massive MIMO transmission may have a cloud radio access network (C-RAN) structure.

According to a second exemplary embodiment of the present disclosure, a centralized processor (CP), in a system performing cell-free massive MIMO (cFmMIMO) transmission, may comprise: a processor; and a memory storing at least one instruction executable by the processor, wherein when executed by the processor, the at least one instruction causes the processor to: request a status report from each of terminals and receive the status report; determine switching from a basic transmission mode to a cell-free massive MIMO transmission mode for at least part of the terminals based on the status reports; instruct the at least part of the terminals and at least one access node (AN) to perform cell-free massive MIMO transmission for the at least part of the terminals to configure the cell-free massive MIMO transmission mode; determine analog beam(s) and/or digital precoder(s) to be applied by the at least one AN to the at least part of the terminals based on channel qualities between the at least part of the terminals and the at least one AN; and allow the at least one AN to perform the cell-free massive MIMO transmission to the at least part of the terminals using the analog beam(s) and/or digital precoder(s).

The basic transmission mode may be a cellular transmission mode in which a single AN provides services to a single terminal.

The cell-free massive MIMO transmission mode may be a mode in which hybrid beamforming-based cooperative transmission in which the at least one AN participates is performed for the at least part of the terminals.

The at least part of the terminals may include terminal(s) requesting switching to the cell-free massive MIMO transmission mode to the CP and/or terminal(s) having a bad channel state.

In the instructing to configure the cell-free massive MIMO transmission mode, the CP may configure a virtual cell identifier (ID) to the at least part of the terminals and the at least one AN as a higher layer parameter.

The channel qualities between the at least part of the terminals and the at least one AN may be measured by sounding reference signal(s) (SRS(s)) transmitted by the at least part of the terminals, and sequence(s) of the SRS(s) may be generated by the virtual cell ID.

The instructing to configure the cell-free massive MIMO transmission mode and scheduling for the cell-free massive MIMO transmission performed by the at least one AN may be performed through two-stage downlink control information (DCI), or performed through one joint DCI.

According to a third exemplary embodiment of the present disclosure, a system performing cell-free massive MIMO (cFmMIMO) transmission may comprise: a centralized processor (CP); a plurality of access nodes (ANs) connected to the CP; and a plurality of terminals, wherein the CP is configured to: request a status report from each of terminals and receive the status report; determine switching from a basic transmission mode to a cell-free massive MIMO transmission mode for at least part of the terminals based on the status reports; instruct the at least part of the terminals and at least one access node (AN) to perform cell-free massive MIMO transmission for the at least part of the terminals to configure the cell-free massive MIMO transmission mode; determine analog beam(s) and/or digital precoder(s) to be applied by the at least one AN to the at least part of the terminals based on channel qualities between the at least part of the terminals and the at least one AN; and allow the at least one AN to perform the cell-free massive MIMO transmission to the at least part of the terminals using the analog beam(s) and/or digital precoder(s), and each of the at least one AN is configured to: perform the cell-free massive MIMO transmission to the at least part of the terminals by using the analog beam(s) and/or digital precoder(s).

The basic transmission mode may be a cellular transmission mode in which a single AN provides services to a single terminal.

The cell-free massive MIMO transmission mode may be a mode in which hybrid beamforming-based cooperative transmission in which the at least one AN participates is performed for the at least part of the terminals.

The instructing to configure the cell-free massive MIMO transmission mode and scheduling for the cell-free massive MIMO transmission performed by the at least one AN may be performed through two-stage downlink control information (DCI), or performed through one joint DCI.

According to the exemplary embodiments of the present disclosure as described above, services may be provided to terminals while a basic transmission mode and a cell-free massive MIMO transmission mode are switched according to statues of the terminals. Accordingly, cell-free massive MIMO transmission may be easily applied even to the LTE and/or NR system, the conventional cellular mobile communication systems.

BRIEF DESCRIPTION OF DRAWINGS

FIG. 7 is a conceptual diagram describing an analog beam determination algorithm in a cell-free massive MIMO transmission procedure according to an exemplary embodiment of the present disclosure.

FIG. 8 is a conceptual diagram describing a design algorithm of a digital precoder in a cell-free massive MIMO transmission procedure according to an exemplary embodiment of the present disclosure.

DETAILED DESCRIPTION OF THE EMBODIMENTS

Figure 1:
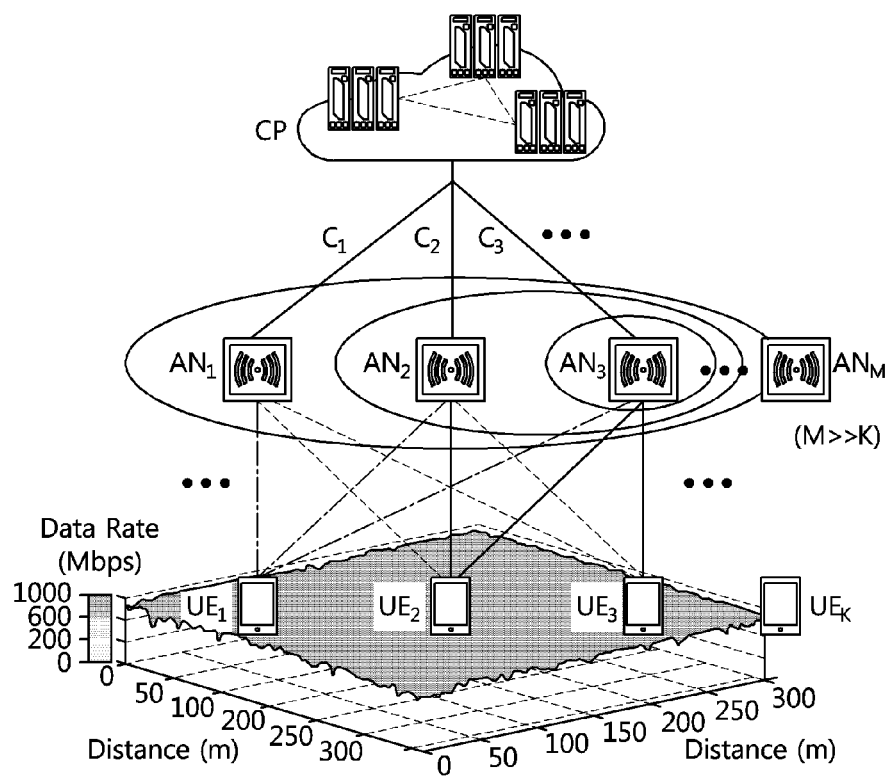
FIG. 1 is a conceptual diagram describing a network environment to which exemplary embodiments of the present disclosure are applied.

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings.

Exemplary embodiments of the present disclosure relate to a data transmission method of a massive MIMO wireless communication system using hybrid beamforming. Specifically, exemplary embodiments of the present disclosure provide, as procedures for interference control and cooperative transmission in the LTE or 5G NR-based cellular system, cell-free massive MIMO transmission methods collectively including determination of necessity of a cell-free massive MIMO transmission state, cell-free massive MIMO transmission state configuration, beam management, channel information acquisition, and data transmission.

Hereinafter, an NR-based mobile communication system and an ultra-dense network (UDN) environment will be exemplified for convenience of description, but exemplary embodiments of the present disclosure are not limited thereto and may be applied to various wireless communication systems. In addition, when purposes or characteristics of physical signals and/or channels mentioned in the present disclosure are similar to specific physical signals and channels of the LTE or NR system, the same names will be reused for convenience. For example, a signal for acquiring downlink channel information to be used in the present disclosure may be described as a channel state information reference signal (CSI-RS) indicating a corresponding signal in the LTE or NR system.

Prior to describing exemplary embodiments of the present disclosure, a brief description on the UDN environment and radio transmission structure to be considered is as follows. As described above, the UDN is a network environment in which cells are miniaturized and density thereof is increased to accommodate explosive and continuously increasing mobile traffic. A cloud radio access network (C-RAN) structure, which can provide functional splitting of base stations, and centralized signal processing and radio resource management, may be considered as a base structure of UDN radio transmission in order to efficiently operate highly dense cells.

FIG. 1 is a conceptual diagram describing a network environment to which exemplary embodiments of the present disclosure are applied.

Referring to FIG. 1, a cloud-based centralized base station or centralized processor (CP) may have a structure in which base nodes (BNs) are centralized to form a pool at one site. The CP may perform complete functions of the existing cell base station with access nodes (ANs) to be described later through modem function splitting on general-purpose processors having high computing power. The CP is able to effectively control inter-cell interference of the UDN through centralized signal processing and resource management, and also is able to process big data.

A capacity-limited packet-based fronthaul (e.g., $C_1$, $C_2$, $C_3$, ..., and the like) may be a packet-based statistical multiplexing fronthaul that improves the existing capacity-limited orthogonal fronthaul. The fronthaul may perform cost-effective and energy-efficient delivery of large-capacity traffic from the CP to densely distributed ANs.

Each of the access nodes (e.g., $AN_1$, $AN_2$, $AN_3$, ..., and $AN_M$) may be configured with one or more antennas, and may support dynamic splitting of modem functions to reduce the fronthaul capacity burden. In the UDN, functions to minimize interference through cooperative transmission between the ANs distributed in high density may be supported, and energy-efficient network operations may be possible through dynamic ON/OFF when necessary.

In the UDN environment considered by exemplary embodiments of the present disclosure, a mmWave interference channel may be modeled in consideration of mmWave communication, which has recently been spotlighted also in the 5G communication due to availability of a wideband, and a time division duplex (TDD) operation may be considered. The TDD operation may assume channel reciprocity between uplink and downlink.

A 1 Gbps-class user equipment (e.g., $UE_1$, $UE_2$, $UE_3$, ..., $UE_K$) may be a terminal that is provided with a consistent user quality of experience (QoE) regardless of a position thereof through cooperative transmission participated by a plurality of distributed ANs. The UE may be provided with a transmission rate of 1 Gbps or more through a wide frequency bandwidth.

Here, since one base station is functionally split into BN(s) and AN(s), the AN may have various forms such as a base station (gNB), a remote radio head (RRH), or an RRH including some of layer 1 (L1) functions. The CP and a plurality of ANs distributed close to the UE may connected through the capacity-limited packet-based fronthaul. Although configurations and functions of the CP and fronthaul vary depending on a form and functions of the AN, signals transmitted from the antenna(s) of the AN may be the same regardless of the configurations and functions of the CP and fronthaul.

In exemplary embodiments of the present disclosure, a cell-free massive MIMO (cFmMIMO) transmission method is proposed as an interference control and cooperative transmission method for providing consistent user QoE regardless of the position of the UE in the given UDN radio transmission structure. Before describing the proposed cell-free massive MIMO transmission method, basic concepts of a 'basic (or, default) transmission mode', that is a default operation mode before the proposed method is performed, and a 'cell-free massive MIMO transmission mode' will be described as follows.

Basic Transmission Mode

The basic transmission mode is a mode (i.e., cellular transmission mode) in which each AN constituting the UDN operates as one transmission and reception point (TRP) or cell. In this case, the entire network may be viewed as a cellular system such as the 4G LTE or 5G NR system.

Figure 2:
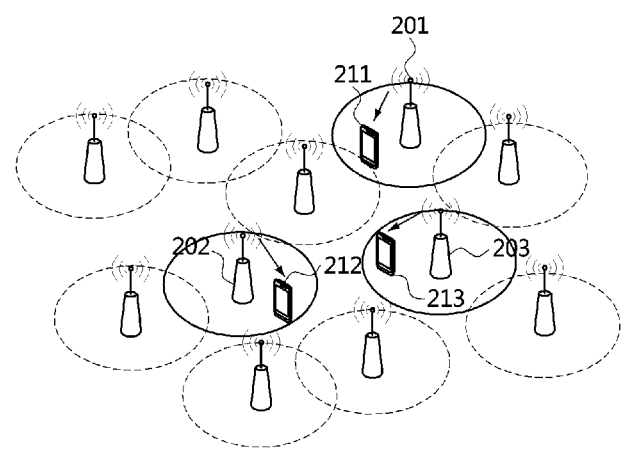
FIG. 2 is a conceptual diagram describing a basic transmission mode according to exemplary embodiments of the present disclosure.

FIG. 2 is a conceptual diagram describing a basic transmission mode according to exemplary embodiments of the present disclosure.

Referring to FIG. 2, each of UEs 211, 212, and 213 may be associated with a corresponding AN 201, 202, or 203 to receive data from the corresponding AN, and when transmitting data, a pair of transmit and receive analog beams having the highest signal quality may be determined, and an optimal digital precoder may be designed based on channel information. According to the operation of the LTE or NR, this mode may be a structure that operates without major problems in general situations where interference is not large or channel conditions are good.

Cell-Free Massive MIMO Transmission Mode

The cell-free massive MIMO transmission mode is a mode in which ANs and UEs configured for cell-free massive MIMO transmission transmit data in the cooperative manner. This mode may be viewed as if all ANs in one cell act as distributed antennas of a single base station, serving all UEs in the cell.

Figure 3:
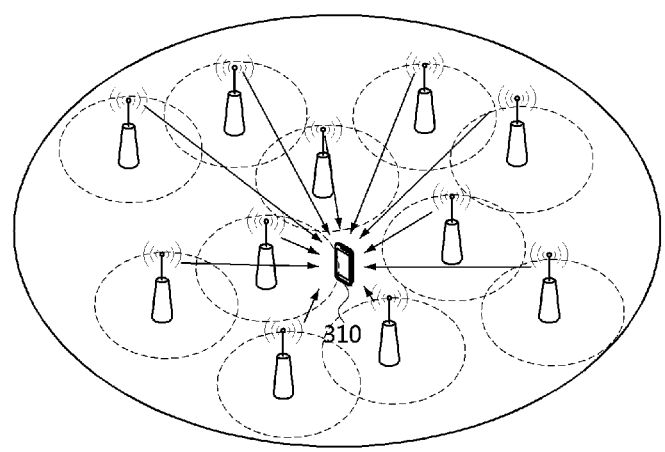
FIG. 3 is a conceptual diagram describing a cell-free massive MIMO transmission mode according to exemplary embodiments of the present disclosure.

FIG. 3 is a conceptual diagram describing a cell-free massive MIMO transmission mode according to exemplary embodiments of the present disclosure.

Referring to FIG. 3, communication with ANs to which cell-free massive MIMO transmission is configured for an arbitrary UE 310 among several UEs is shown. Since data is transmitted from all the configured ANs, a massive MIMO network is configured around the UE 310 so that the UE 310 can feel as if there is no cell boundary, and thus this is called the cell-free massive MIMO transmission.

In an exemplary embodiment of the present disclosure, a procedure for performing communication by switching from the above-described basic transmission mode to the cell-free massive MIMO transmission mode is proposed. Since the following descriptions focus on a data transmission process, it is assumed that procedures or signaling required for the data transmission process, such as initial access, control channel transmission, and mobility management, are already performed. That is, in the following descriptions, it is assumed that the UE is already connected to the network, which means that it is assumed that an initial access procedure is already performed. Therefore, assuming that the UE receiving a service is synchronized with the network through a certain scheme, and acquires system information, subsequent transmission processes will be described step by step.

Figure 4:
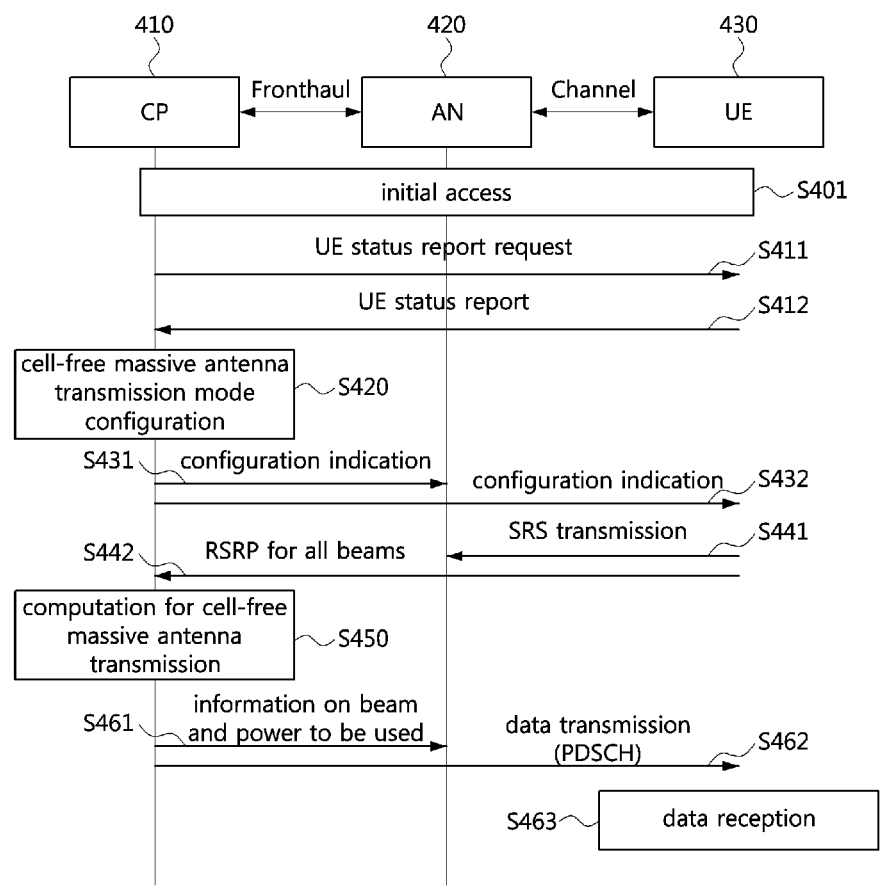
FIG. 4 is a sequence chart describing a cell-free massive MIMO transmission procedure according to an exemplary embodiment of the present disclosure.

FIG. 4 is a sequence chart describing a cell-free massive MIMO transmission procedure according to an exemplary embodiment of the present disclosure.

Referring to FIG. 4, operations of a CP 410, AN 420, and UE 430 are described. For convenience of description, the operations of one AN 420 and one UE 430 are described in FIG. 4, but in an actual UDN environment, a much larger number of ANs and UEs may exist. A cell-free massive MIMO transmission procedure may largely include a process of configuring a cell-free massive MIMO transmission state, a process of computation for cell-free massive MIMO transmission, and a process of data transmission/reception. Hereinafter, the above processes will be sequentially described, but since the data transmission/reception process is not significantly different from the general communication process, the description thereof will be omitted. In addition, since a method of configuring control information for the cell-free massive MIMO transmission is different from the method of configuring control information for data transmission of the existing LTE or NR system, a description thereof will be added.

Cell-Free Massive MIMO Transmission Mode Configuration

Referring to FIG. 4, the network may request UEs having made initial access (S401) to report statuses for data transmission (S411), and the UE 430 may report its own status (e.g., measured channel state) to the CP 410 via the AN 420 (S412). According to the reported statuses, the CP 410 may determine to configure the cell-free massive MIMO transmission mode (S420), and instruct the AN 420 and the UE 430 to configure the cell-free massive MIMO transmission mode, respectively (S431, S432). In this case, the step S431 may be performed through a fronthaul interface between the CP 410 and the AN 420, and the step S432 may be performed through a physical downlink control channel (PDCCH) transmitted from the AN 420 to the UE 430. In the following description, the step S432 is described as being performed through a PDCCH, but in another exemplary embodiment, the step S432 may be performed through radio resource control (RRC) signaling.

In this case, an indicator indicating the configuration for the cell-free massive MIMO transmission mode transmitted by the CP 410 to the AN 420 or the UE 430 may include an indication to perform a procedure (e.g., SRS transmission and channel quality measurement reporting) that is a procedure for the CP 410 to obtain information required for the cell-free massive MIMO transmission.

The biggest shortcoming of the cellular system is that an edge region exists for each cell, so that UEs having very poor communication quality may exist. This is a phenomenon that inevitably occurs even in a high-density network environment such as the UDN, and may seriously affect communication quality together with the problem of increased inter-cell interferences. In addition, in the millimeter wave communication environment considered in the exemplary embodiments of the present disclosure, a blockage may occur when a person or object exists in a communication path due to radio wave characteristics, or a problem such as analog beam mismatch may occur according to a movement of the UE due to the characteristics of the system using analog beams, and in this reason, the communication quality may be momentarily deteriorated. Therefore, a status report of the UE according to various situations is a very important issue, and when the UE is at an edge region of the cell or a communication link is disconnected due to the above-mentioned reasons, the UE may transmit the status report to the CP, and according to the reported information, the CP may recognize whether the cell-free massive MIMO transmission is required. An example of a method in which the UE reports a channel state to the CP and the CP determines whether the cell-free massive MIMO transmission is required may be as follows.

Method 1) The UE may transmit an indicator to the CP, and based on the indicator, the CP may determine that the cell-free massive MIMO transmission is required. When the UE, which has measured a channel state (i.e., channel quality), determines that the cell-free massive MIMO transmission is required because the channel state is too poor, the UE may indicate such the information (e.g., 1 bit information) to the CP when reporting the channel state through a PUCCH or physical uplink shared channel (PUSCH), and the CP may configure the cell-free massive MIMO transmission mode for UEs reporting the corresponding indicator.

Method 2) When the UE reports channel state information (CSI) to the AN or CP, the AN or the CP may determine that the cell-free massive MIMO transmission is required based on the corresponding channel state information. For example, even when there is no specific indication from the UE, if a CQI below a certain threshold is reported or the channel quality is poor compared to the amount of data to be transmitted, the AN and/or CP may configure the cell-free massive MIMO transmission mode.

When the UE transmits the indicator or CSI report to the CP, the CP may comprehensively determine the information reported by all the UEs in the entire network to configure the cell-free massive MIMO transmission mode. The CP may configure the cell-free massive MIMO transmission mode as follows.

The CP may configure a UE group to perform the cell-free massive MIMO transmission based on the reports of the UEs. That is, the CP may identify UE(s) that have transmitted the indicator and the UE(s) having a poor channel state as UEs that require the cell-free massive MIMO transmission from the viewpoint of downlink data transmission, and may configure the UE group according to an appropriate ratio similarly to scheduling depending on communication timing. That is, the UE group may be composed of only UEs that have transmitted the indicator or may be composed of only UEs having poor channel states. Alternatively, a part of the UE group may be composed of UE(s) that have transmitted the indicator, and the remaining part of the UE group may be composed of UE(s) having poor channel states. The CP may configure an AN group including ANs associated with the UEs constituting the configured UE group and ANs capable of additionally participating in transmission for the corresponding UEs in consideration of network traffic conditions.

Figure 5:
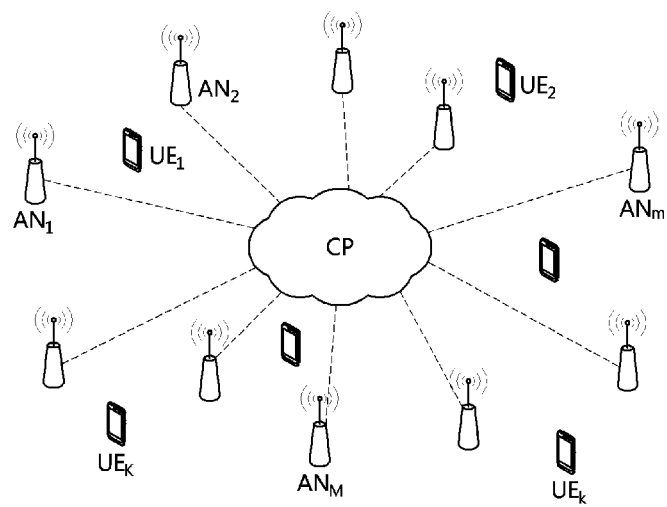
FIG. 5 is a conceptual diagram illustrating a cell-free massive MIMO system in which a cell-free massive MIMO transmission state is configured according to an exemplary embodiment of the present disclosure.

FIG. 5 is a conceptual diagram illustrating a cell-free massive MIMO system in which a cell-free massive MIMO transmission state is configured according to an exemplary embodiment of the present disclosure.

Referring to FIG. 5, the number of UEs constituting the UE group may be K, and the number of ANs constituting the AN group may be M. In this case, M and K may be determined according to an expected performance, but (M>>K) should be basically established. The UDN satisfies this condition well because it is an environment in which the number of ANs is much greater than the number of UEs.

In such the system configuration state, the CP may configure a virtual cell identifier (ID) to the ANs and UEs for which the cell-free massive MIMO transmission mode is configured as a higher layer parameter. The virtual cell ID may make the corresponding ANs and UEs operate like an area separate from a basic cell identified by the existing physical cell identifier (PCI), and may be used to distinguish CSI-RS/SRS resources for beam management and channel information acquisition, which will be described later, from the CSI-RS/SRS resources used in the existing cell (i.e., an independent sequence not reused in the existing resources may be used for the CSI-RS/SRS resource).

Meanwhile, since a virtual cell ID may be assigned even in the existing LTE or NR system, a virtual cell ID for cell-free massive MIMO transmission may be additionally introduced to differentiate it. Therefore, when a virtual cell ID is configured as a higher layer parameter and the indicator indicating cell-free massive MIMO transmission is configured by downlink control information (DCI), the AN and the UE may determine that the cell-free massive MIMO transmission mode is configured.

Computation for Cell-Free Massive MIMO Transmission

The ANs and UEs for which the cell-free massive MIMO transmission state is configured may perform a step (1) of beam management and channel information acquisition processes for downlink data transmission, a step (2) of determining an optimal analog beam, and a step (3) of designing a digital precoder and calculating a power allocation. The above procedures will be described in detail as follows.

(1) Beam Management and Channel Information Acquisition

For downlink data transmission, beam management and channel information acquisition procedures are essential. In general, the beam management and channel information acquisition procedures may be defined for both downlink and uplink, and beam management information and channel information may be acquired through CSI-RS/SRS transmission and measurement. In this case, information on required CSI-RS/SRS resources may be configured to the UE through RRC signaling. Prior to configuring the resource information, the number of beams of each UE, the maximum number of simultaneously available beams in each UE, and the number of antenna ports of the UE may be reported as UE capability. The CP may configure the information on resources required for beam management by further reflecting information on the ANs, such as the number of beams of each AN. If the beam management and channel information acquisition procedures are defined for uplink or downlink, resources to be used among the resources configured through RRC signaling may be activated by a MAC CE or DCI, and the beam management and channel information acquisition procedure may be performed.

Unlike the existing cellular system that requires beam management and channel information acquisition between a single AN and a UE, the cell-free massive MIMO system requires beam management and channel information acquisition between all ANs and all UEs participating in communication. Therefore, an uplink process is advantageous and preferred due to the large number of ANs over a downlink process preferred in the existing cellular system. In order to activate the resources for performing the beam management and channel information acquisition process, the DCI including the indicator indicating the cell-free massive MIMO transmission state of the above-described step (S432) may further include an indicator indicating resources activated among general resources. By interpreting the activated resources (e.g., SRS resource, SRS port), the UE may determine information on analog beams to be used in beam management (e.g., the number of beams to be simultaneously used, a beam transmission time during the beam management, etc.). When configuring the resource information, information such as the number of analog beams in the AN should be reflected.

In this case, the beams used by the AN and the UE may be determined by themselves because it is an implementation issue, but in the cell-free massive MIMO system, the CP may designate the beams to be used by the AN and the UE, or the beams may be separately designed or indicated. The designation, design, and indication from the CP to the AN may be possible by additionally defining a function in a fronthaul interface, and the designation from the CP to the UE may be performed by including a transmission control indicator (TCI) in the DCI. It may be difficult to separately design and indicate a UE beam, where designation is possible for a beam used in the existing initial access procedure or a beam used when receiving control information. Unlike the DCI for conventional beam management, in the DCI for cell-free massive MIMO transmission, TCI information is defined and a beam designated by the CP is used for beam management, whereas the DCI for data scheduling does not configure separate TCI information. This is a difference from the operation of the existing cellular system.

Figure 6:
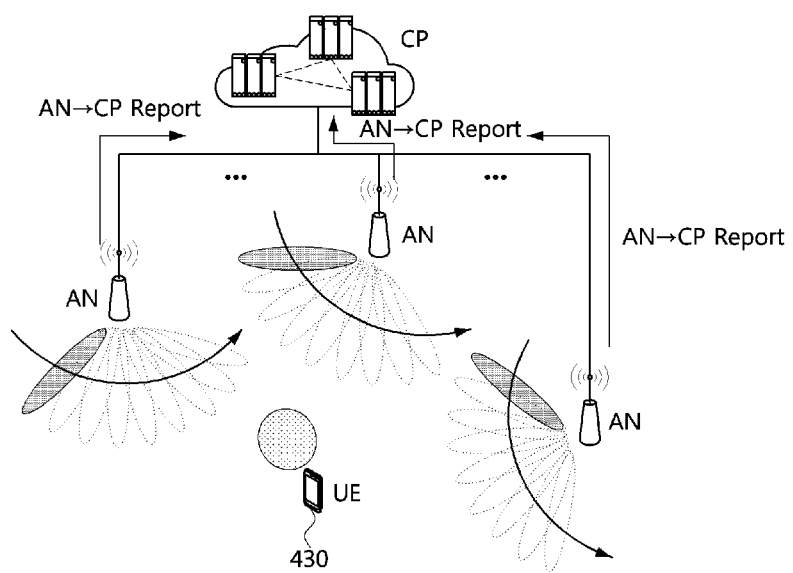
FIG. 6 is a conceptual diagram describing beam management and channel information acquisition for computation for cell-free massive MIMO transmission according to an exemplary embodiment of the present disclosure.

FIG. 6 is a conceptual diagram describing beam management and channel information acquisition for computation for cell-free massive MIMO transmission according to an exemplary embodiment of the present disclosure.

Referring to FIG. 6, the UE 430 may transmit a reference signal (e.g., SRS) with a predetermined analog beam (S441 in FIG. 4), and each AN may measure a beam quality while simultaneously performing receive beam sweeping, and report the measured beam quality to the CP 410 through the fronthaul (S442 in FIG. 4). The beam quality may be expressed as a reference signal received power (RSRP), which is a reception power of the reference signal using the analog beam. When beam measurement on the transmission beam of one UE by all beams of all the ANs is completed, the beam measurement result may be reported to the CP (S442). When the beam quality information for all the UEs is aggregated in the CP, channel information of the entire network may also be calculated. The CP may use this to determine an analog beam to be used by each AN. In addition, the CP may design a digital precoder to be used by each AN by using the above information. However, in case of hybrid beamforming, a digital precoder to be used by each AN may be designed by each AN.

(2) Analog Beam Selection

The CP may determine an analog beam to be used by each AN based on RSRP information for the respective beams reported from the AN (S450).

FIG. 7 is a conceptual diagram describing an analog beam determination algorithm in a cell-free massive MIMO transmission procedure according to an exemplary embodiment of the present disclosure.

The method for analog beam determination is not limited to an algorithm to be described later. When indexes of the ANs, beam indexes of the ANs, an index of the UE, and corresponding RSRP values are input from the ANs to the CP, various algorithms for outputting an index of a beam to be used by each AN from the CP may be used.

Exemplary Algorithm for Analog Beam Selection (System Assumption)

each of M ANs may select L analog beams among B candidate analog beams, there are K UEs (i.e., K>L), one analog beam of the AN and one UE are associated with each other. A correspondence between the b-th analog beam of the m-th AN and the k-th UE may be expressed by (m, b, k), and when different UEs are connected to one AN, they may be connected through different beams of the AN.

(Description on Parameters)

S may represent a set of (m, b, k), i.e., the selected ANs and analog beams of the selected ANs and UEs. A may represent a set of available analog beams (m, b). A $RSRP_{m,b,k}$ may represent an RSRP value of the b-th analog beam of the m-th AN at the k-th UE.

(Description on Algorithm)

The number M of ANs in the system, the number B of candidate analog beams of the AN, the number L of analog beams that each AN should select, and the number K of UEs are given, and when RSRP values are received at the CP, the algorithm may find a UE with the minimum RSRP sum value for each loop (i.e., step 3), and find an and an analog beam with the maximum RSRP sum value at the UE (i.e., step 4). A combination of the found AN, analog beam, and UE may be stored (i.e., step 5), and a combination of the corresponding AN and analog beam may be excluded from selectable analog beam combinations (i.e., step 6). Analog beams are determined until the number of analog beams found for each AN becomes L, and when the number of analog beams of a certain AN becomes L, the AN may be excluded from the analog beam search targets in the next loop (i.e., steps 7 to 10). The above process may be repeated until all M×L analog beams are found in the network to finally determine analog beams to be used for all ANs.

(3) Digital Precoder Design and Power Allocation Calculation

After the analog beam is determined, for a channel to which analog beamforming is applied, the CP should design a digital precoder and calculate a power allocation for optimal data transmission. In general cell-free massive MIMO transmission, the well-known maximum ratio transmission (MRT) scheme or zero-forcing (ZF) scheme may be used. Alternatively, a PCA approach-based algorithm that is a scheme for maximizing a sum spectral efficiency in such a Multicell MU-MIMO or C-RAN system.

FIG. 8 is a conceptual diagram describing a design algorithm of a digital precoder in a cell-free massive MIMO transmission procedure according to an exemplary embodiment of the present disclosure.

Although additional pre-processing is required to execute the algorithm shown in FIG. 8, a detailed description thereof will be omitted.

The digital precoder and the power allocation value obtained as a result of the above process may be transmitted to each AN (S461 in FIG. 4). The CP may transmit a signal including data to be transmitted by each AN, information on the digital precoder, and the power allocation value to the AN through the fronthaul. The AN may transmit the data to the UE 430 by applying the analog beam determined in the previous step as well as the digital precoder and power value (S462). Meanwhile, in order to generate the signal transmitted through the fronthaul, the above-described beam management, channel information acquisition, analog beam selection, digital precoder design, and power allocation calculation procedures may be performed in the CP at once, and when the actual data transmission procedure is performed, the index of the beam to be used by each AN and the compressed data signal may be simultaneously delivered from the CP to each AN.

Cell-Free Massive MIMO Transmission Control Information Configuration

When performing the above-described cell-free massive MIMO transmission procedure, a DCI indicating beam management and channel information acquisition and a DCI for PDSCH scheduling are required. In this case, the DCI indicating beam management and channel information acquisition may include the cell-free massive MIMO transmission state indicator as control information for performing the cell-free massive MIMO transmission, and may further include information on SRS resources required for the beam management and channel information acquisition and the beam indication information (i.e., TCI). Thereafter, the DCI indicating data transmission may include PDSCH scheduling information. However, the above items may be specific information for the cell-free massive MIMO transmission, and in addition to these, information constituting the DCI defined in the LTE and/or NR system to perform a communication procedure may also be included. A method of configuring two DCIs in performing the cell-free massive MIMO transmission procedure is as follows.

Scheme 1) A Scheme of Configuring a 2-Stage DCI

Figure 9:
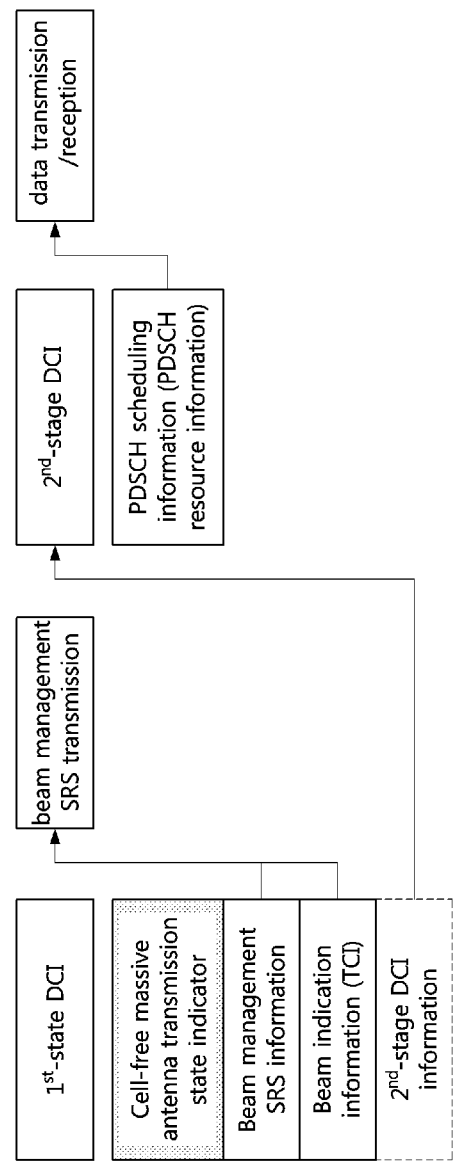
FIG. 9 is a conceptual diagram describing cell-free massive MIMO transmission control information configured by a 2-stage DCI according to an exemplary embodiment of the present disclosure.

FIG. 9 is a conceptual diagram describing cell-free massive MIMO transmission control information configured by a 2-stage DCI according to an exemplary embodiment of the present disclosure.

Referring to FIG. 9, a DCI (i.e., $1^{st}$ stage DCI) for performing a beam management and channel information acquisition procedure performed prior to data transmission may be first configured, and a DCI (i.e., $2^{nd}$ stage DCI) for PDSCH scheduling may be configured after the beam management and channel information acquisition procedure is performed. In this case, the $2^{nd}$ state DCI may be configured in association with the $1^{st}$ stage DCI or configured independently from the $1^{st}$ stage SCI.

Scheme 2) A Scheme of Configuring a Joint DCI

Figure 10:
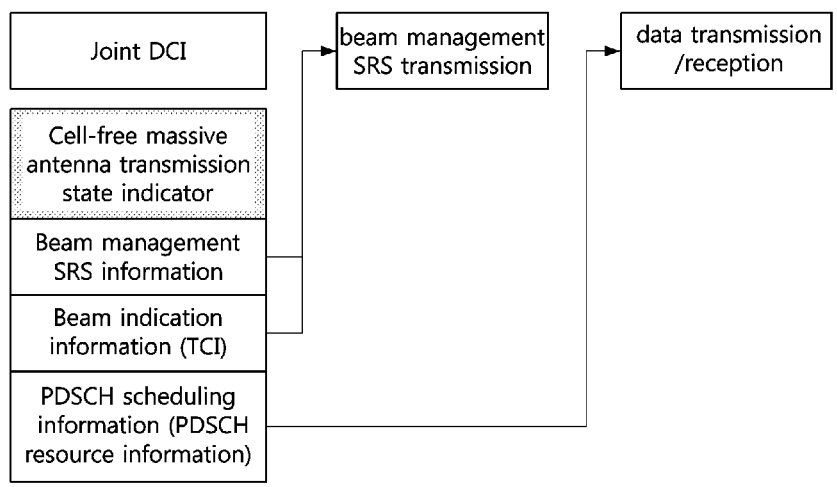
FIG. 10 is a conceptual diagram describing cell-free massive MIMO transmission control information configured with a joint DCI according to an exemplary embodiment of the present disclosure.

FIG. 10 is a conceptual diagram describing cell-free massive MIMO transmission control information configured with a joint DCI according to an exemplary embodiment of the present disclosure.

Referring to FIG. 10, since the beam management and channel information acquisition procedure and the data transmission procedure are continuously performed in the cell-free massive MIMO transmission process, and the respective pieces of information do not overlap each other, one DCI may be configured. This makes it possible to perform procedures resource-efficiently.

The transmission of control information may be basically performed by using the previously used transmit/receive analog beam through the AN to which the UE initially accessed and reported its status. However, transmission of control information through another AN, another analog beam, or multiple ANs may be considered as needed.

In the LTE and/or NR system, the beam management procedure and the channel information acquisition procedure are performed separately, and each procedure is controlled by an independent DCI. However, in an exemplary embodiment of the present disclosure, the beam management procedure and the channel information acquisition procedure are performed simultaneously, and controlled together by using one DCI. In addition, the present disclosure further proposes configuration of control information that can be simultaneously indicated by one DCI when considering procedures up to data transmission. This may be a procedure that cannot be operated with the configuration of the current LTE and/or NR control information.

Transmission Mode Switching Procedure

The procedure of switching from the basic transmission mode to the cell-free massive MIMO transmission mode has been described above. After the transmission mode switching, some ANs and UEs may return to the basic transmission mode, and other ANs and UEs may be newly switched to the cell-free massive MIMO transmission mode. Even in this case, a transmission mode switching procedure of each of AN and UE is required. That is, a UE that has received all data in the cell-free massive MIMO transmission mode may return to the basic transmission mode, and accordingly, ANs participating in cooperative transmission may be changed. In this reason, specific transmission mode switching conditions and procedures should be defined.

Hereinafter, specific transmission mode switching conditions and procedures will be described. However, in general, it is possible to configure a plurality of cell-free massive MIMO transmissions in the network, but in the exemplary embodiments of the present disclosure, it is assumed that one cell-free massive MIMO transmission state is configured. In case of a plurality of cell-free massive MIMO transmission states, it is assumed that each transmission is performed independently. When the transmission mode is switched, the CP may first determine the transmission mode of the UE, and accordingly determine the transmission mode of the AN, similarly to the case of configuring the cell-free massive MIMO transmission state.

Figure 11:
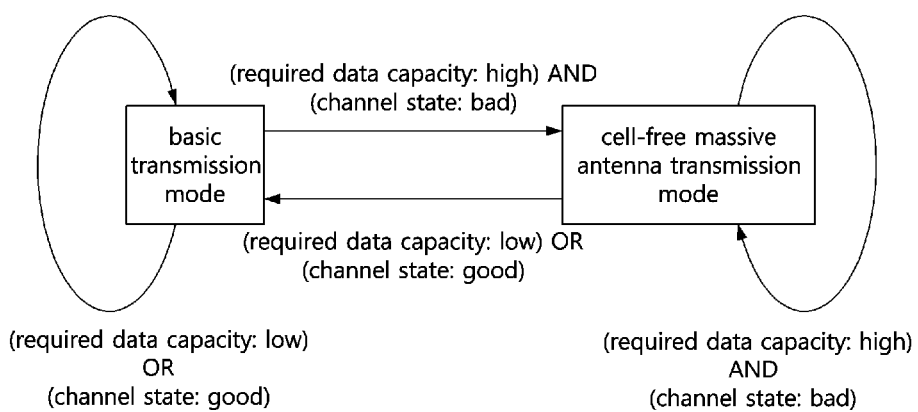
FIG. 11 is a conceptual diagram describing transmission mode switching conditions according to an exemplary embodiment of the present disclosure.

FIG. 11 is a conceptual diagram describing transmission mode switching conditions according to an exemplary embodiment of the present disclosure.

Referring to FIG. 11, transmission mode switching of the UE may be determined by two conditions: a required data capacity (data traffic) and a channel state. In this case, a high or low required data capacity, or a good or bad channel state may be determined by comparison with a specific data capacity threshold and a specific channel state threshold, and the specific values may be determined by implementation according to a communication environment and situation.

Figure 12:
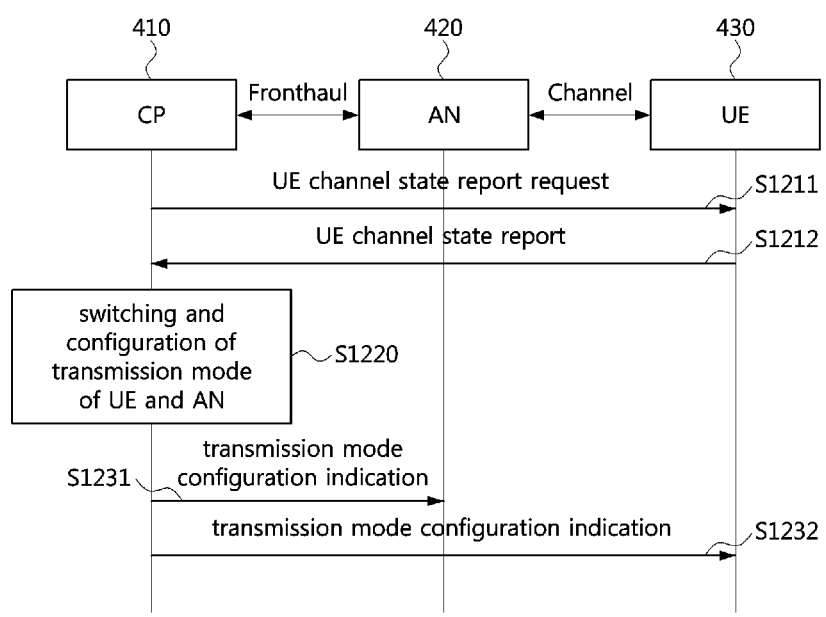
FIG. 12 is a sequence chart illustrating a transmission mode switching procedure according to an exemplary embodiment of the present disclosure.

FIG. 12 is a sequence chart illustrating a transmission mode switching procedure according to an exemplary embodiment of the present disclosure.

Referring to FIG. 12, similarly to FIG. 4, operations of the CP 410, AN 420, and UE 430 will be described. For convenience of description, the operations of one AN 420 and one UE 430 are described in FIG. 12, but a much larger number of ANs and UEs may exist in an actual UDN environment.

Referring to FIG. 12, the CP 410 may request a channel state report from the UE 430 at a certain point in time (S1211), and the UE 430 may report a CSI to the CP 410 through the AN 420 (S1212). Based on the reported channel information and required data capacity information, the CP 410 may determine and configure UE(s) to newly receive cell-free massive MIMO transmission, UE(s) to return to the basic transmission mode, and UE(s) to maintain the transmission mode (S1220). In addition, according to the determination result, the CP 410 may indicate configuration to ANs to perform the cell-free massive MIMO transmission and ANs to perform the basic transmission (S1231). The method of configuring the transmission mode to the UE (S1232) may be the same as the method of configuring the cell-free massive MIMO transmission state (i.e., PDCCH or RRC signaling). Configuration may be indicated to the UE(s) returning to the basic transmission mode by not giving a separate indicator to them.

Figure 13:
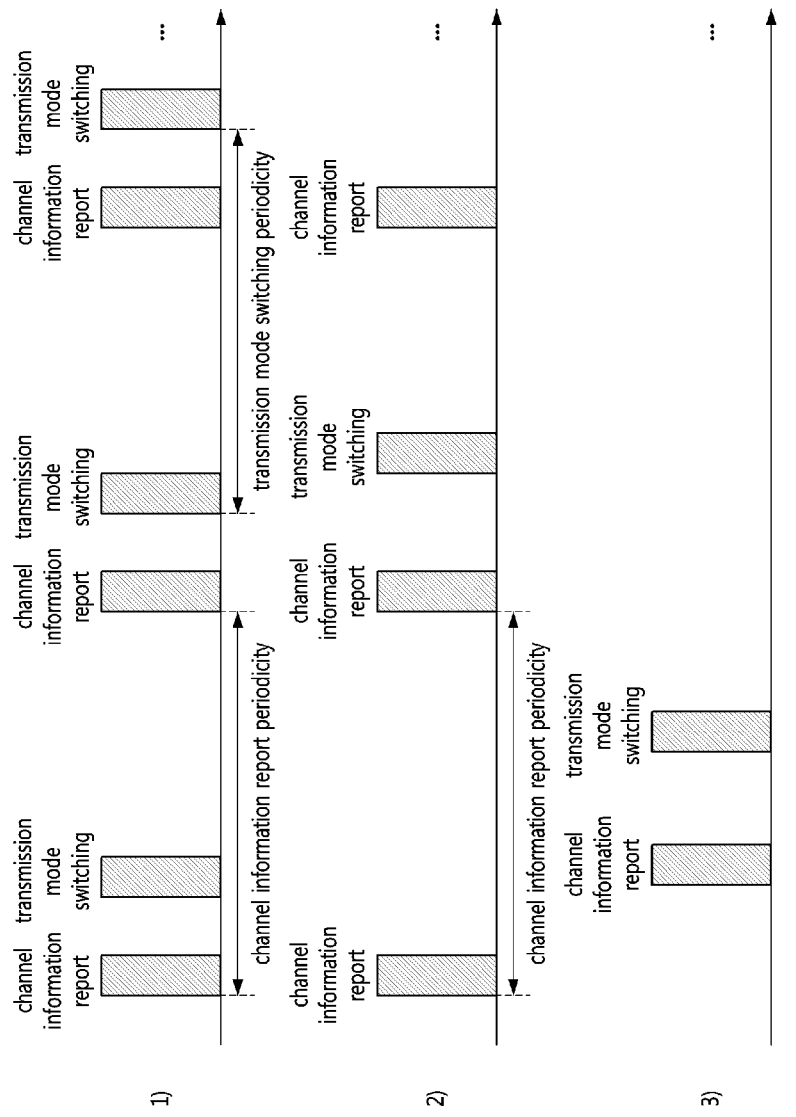
FIG. 13 is a conceptual diagram describing periodic or aperiodic relationships between transmission mode switching and channel information reporting according to an exemplary embodiment of the present disclosure.

FIG. 13 is a conceptual diagram describing periodic or aperiodic relationships between transmission mode switching and channel information reporting according to an exemplary embodiment of the present disclosure.

Referring to FIG. 13, the transmission mode switching may be performed periodically or aperiodically (semi-persistent operation is omitted because it is similar to an aperiodic operation). Since the cell-free massive MIMO transmission is performed by channel information reports of UEs, there is a temporal correlation between the channel information reporting operation and the transmission mode switching operation, and the relationship may be as follows.

1) Periodic channel information reporting→periodic transmission mode switching
2) Periodic channel information reporting→aperiodic transmission mode switching
3) Aperiodic channel information reporting→aperiodic transmission mode switching First, the case 1) indicates that when the channel information reporting is periodically performed, the transmission mode switching may also be performed periodically accordingly. The case 2) indicates that transmission mode switching may be performed aperiodically. Also, if aperiodic channel information reporting is performed by a DCI as in the case 3), the transmission mode switching may be performed a periodically accordingly. Here, since the periodic transmission mode switching performs the transmission mode switching after the periodic channel information reporting, it is not necessary to separately define a transmission mode switching periodicity, etc., and only a mode switching procedure is required. Also, the aperiodic transmission mode switching may be triggered by determination of the network without configuring a specific time or periodicity. However, it should be noted that, since the transmission mode switching is based on the channel information reporting, the periodic transmission mode switching cannot be performed by the aperiodic channel information reporting.

Cell-Free Massive MIMO Transmission in a Cellular System Without an Explicit CP

The CP is an essential component in the above-described cell-free massive MIMO transmission method and its processes. If a network is specified and implemented as a UDN C-RAN structure in an environment requiring UDN, the CP may be an implementable component and there is no significant problem in performing the cell-free massive MIMO transmission. However, in order to perform the cell-free massive MIMO transmission in the existing 3GPP cellular system such as the LTE and/or NR, it is necessary to implement the CP and provide an inter-cell interface specification like the X2 interface for CoMP.

Hereinafter, cell-free massive MIMO transmission in a cellular system without an explicit CP will be dealt with, which is largely a form in which one base station acts as a CP to cooperate with other base stations or a form in which cell-free massive MIMO transmission is performed within one base station. For reference, in both the implementations, configuration of control information for indicating to perform the cell-free massive MIMO transmission may follow the above-described cell-free massive MIMO transmission control information configuration.

When one base station acts as a CP and cooperates with other base stations, an upper base station that can control multiple base stations may act as a CP to indicate cell-free massive MIMO transmission to small cells located below. The procedure in this case may be the same as the procedure for performing the cell-free massive MIMO transmission described above. However, a different procedure may be required for multiple cells of the same level to perform cell-free massive MIMO transmission without an explicit CP. For example, a separate specific method such as performing cooperative transmission in a distributed form while exchanging messages between the base stations may be additionally required. Since this is outside the scope of the present disclosure, details thereof will not be dealt with here.

When performing cell-free massive MIMO transmission within one base station, multiple TRPs connected to one base station may perform the cell-free massive MIMO transmission. If a gNB is replaced with a CP and a TRP is replaced with an, the above-described cell-free massive MIMO transmission procedures may be applied without difficulty. Conventional inter-base station cooperative transmission methods are difficult to implement under realistic conditions, and theoretical performance gains are also not guaranteed. In this reason, this scheme may be in line with the trend that the current LTE and/or NR system is gradually adopting a cooperative transmission method that is less burdensome for TRPs within one base station.

Figure 14:
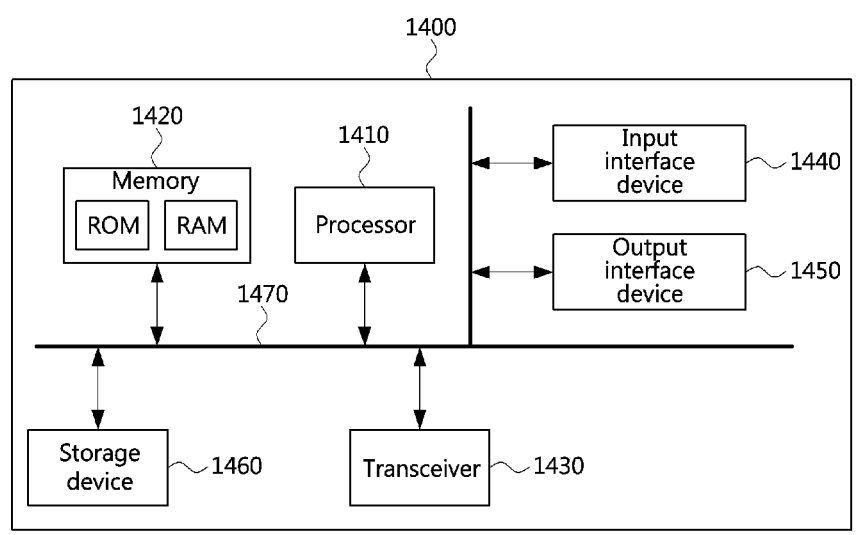
FIG. 14 is a block diagram illustrating a configuration of an apparatus for performing methods according to exemplary embodiments of the present disclosure.

FIG. 14 is a block diagram illustrating a configuration of an apparatus for performing methods according to exemplary embodiments of the present disclosure.

An apparatus shown in FIG. 14 may be a communication node (e.g., CP, AN, or terminal) for performing the methods according to the exemplary embodiments of the present disclosure.

Referring to FIG. 14, a communication node 1400 may comprise at least one processor 1410, a memory 1420, and a transceiver 1430 connected to the network for performing communications. Also, the communication node 1400 may further comprise an input interface device 1440, an output interface device 1450, a storage device 1460, and the like. Each component included in the communication node 1400 may communicate with each other as connected through a bus 1470. However, each component included in the communication node 1400 may be connected to the processor 1410 via an individual interface or a separate bus, rather than the common bus 1470. For example, the processor 1410 may be connected to at least one of the memory 1420, the transceiver 1430, the input interface device 1440, the output interface device 1450, and the storage device 1460 via a dedicated interface.

The processor 1410 may execute a program stored in at least one of the memory 1420 and the storage device 1460. The processor 1410 may refer to a central processing unit (CPU), a graphics processing unit (GPU), or a dedicated processor on which methods in accordance with embodiments of the present disclosure are performed. Each of the memory 1420 and the storage device 1460 may be constituted by at least one of a volatile storage medium and a non-volatile storage medium. For example, the memory 1420 may comprise at least one of read-only memory (ROM) and random access memory (RAM).

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a centralized processor (CP) in a system performing cell-free massive MIMO (cFmMIMO) transmission, the operation method comprising:
   requesting a status report from each of terminals and receiving the status report;
   determining switching from a basic transmission mode to a cell-free massive MIMO transmission mode for at least part of the terminals based on the status reports;
   instructing the at least part of the terminals and at least one access node (AN) to perform cell-free massive MIMO transmission for the at least part of the terminals to configure the cell-free massive MIMO transmission mode;
   determining analog beam(s) and/or digital precoder(s) to be applied by the at least one AN to the at least part of the terminals based on channel qualities between the at least part of the terminals and the at least one AN; and
   allowing the at least one AN to perform the cell-free massive MIMO transmission to the at least part of the terminals using the analog beam(s) and/or digital precoder(s).

2. The operation method according to claim 1, wherein the basic transmission mode is a cellular transmission mode in which a single AN provides services to a single terminal.

3. The operation method according to claim 1, wherein the cell-free massive MIMO transmission mode is a mode in which hybrid beamforming-based cooperative transmission in which the at least one AN participates is performed for the at least part of the terminals.

4. The operation method according to claim 1, wherein the at least part of the terminals include terminal(s) requesting switching to the cell-free massive MIMO transmission mode to the CP and/or terminal(s) having a bad channel state.

5. The operation method according to claim 1, wherein in the instructing to configure the cell-free massive MIMO transmission mode, the CP configures a virtual cell identifier (ID) to the at least part of the terminals and the at least one AN as a higher layer parameter.

6. The operation method according to claim 5, wherein the channel qualities between the at least part of the terminals and the at least one AN are measured by sounding reference signal(s) (SRS(s)) transmitted by the at least part of the terminals, and sequence(s) of the SRS(s) is generated by the virtual cell ID.

7. The operation method according to claim 6, wherein each of the channel qualities is measured as a reference signal received power (RSRP).

8. The operation method according to claim 1, wherein the instructing to configure the cell-free massive MIMO transmission mode and scheduling for the cell-free massive MIMO transmission performed by the at least one AN are performed through two-stage downlink control information (DCI), or performed through one joint DCI.

9. The operation method according to claim 1, wherein the system performing the cell-free massive MIMO transmission has a cloud radio access network (C-RAN) structure.

10. A centralized processor (CP) in a system performing cell-free massive MIMO (cFmMIMO) transmission, the CP comprising:
   a processor; and
   a memory storing at least one instruction executable by the processor,
   wherein when executed by the processor, the at least one instruction causes the processor to:
   request a status report from each of terminals and receive the status report;
   determine switching from a basic transmission mode to a cell-free massive MIMO transmission mode for at least part of the terminals based on the status reports;
   instruct the at least part of the terminals and at least one access node (AN) to perform cell-free massive MIMO transmission for the at least part of the terminals to configure the cell-free massive MIMO transmission mode;

determine analog beam(s) and/or digital precoder(s) to be applied by the at least one AN to the at least part of the terminals based on channel qualities between the at least part of the terminals and the at least one AN; and allow the at least one AN to perform the cell-free massive MIMO transmission to the at least part of the terminals using the analog beam(s) and/or digital precoder(s).

11. The CP according to claim 10, wherein the basic transmission mode is a cellular transmission mode in which a single AN provides services to a single terminal.

12. The CP according to claim 10, wherein the cell-free massive MIMO transmission mode is a mode in which hybrid beamforming-based cooperative transmission in which the at least one AN participates is performed for the at least part of the terminals.

13. The CP according to claim 10, wherein the at least part of the terminals include terminal(s) requesting switching to the cell-free massive MIMO transmission mode to the CP and/or terminal(s) having a bad channel state.

14. The CP according to claim 10, wherein in the instructing to configure the cell-free massive MIMO transmission mode, the CP configures a virtual cell identifier (ID) to the at least part of the terminals and the at least one AN as a higher layer parameter.

15. The CP according to claim 14, wherein the channel qualities between the at least part of the terminals and the at least one AN are measured by sounding reference signal(s) (SRS(s)) transmitted by the at least part of the terminals, and sequence(s) of the SRS(s) is generated by the virtual cell ID.

16. The CP according to claim 10, wherein the instructing to configure the cell-free massive MIMO transmission mode and scheduling for the cell-free massive MIMO transmission performed by the at least one AN are performed through two-stage downlink control information (DCI), or performed through one joint DCI.

17. A system performing cell-free massive MIMO (cFm-MIMO) transmission, the system comprising:
a centralized processor (CP);
a plurality of access nodes (ANs) connected to the CP; and
a plurality of terminals,
wherein the CP is configured to: request a status report from each of terminals and receive the status report; determine switching from a basic transmission mode to a cell-free massive MIMO transmission mode for at least part of the terminals based on the status reports; instruct the at least part of the terminals and at least one access node (AN) to perform cell-free massive MIMO transmission for the at least part of the terminals to configure the cell-free massive MIMO transmission mode; determine analog beam(s) and/or digital precoder(s) to be applied by the at least one AN to the at least part of the terminals based on channel qualities between the at least part of the terminals and the at least one AN; and allow the at least one AN to perform the cell-free massive MIMO transmission to the at least part of the terminals using the analog beam(s) and/or digital precoder(s), and
wherein each of the at least one AN is configured to: perform the cell-free massive MIMO transmission to the at least part of the terminals by using the analog beam(s) and/or digital precoder(s).

18. The system according to claim 17, wherein the basic transmission mode is a cellular transmission mode in which a single AN provides services to a single terminal.

19. The system according to claim 17, wherein the cell-free massive MIMO transmission mode is a mode in which hybrid beamforming-based cooperative transmission in which the at least one AN participates is performed for the at least part of the terminals.

20. The system according to claim 17, wherein the instructing to configure the cell-free massive MIMO transmission mode and scheduling for the cell-free massive MIMO transmission performed by the at least one AN are performed through two-stage downlink control information (DCI), or performed through one joint DCI.

* * * * *